United States Patent
Nakamura et al.

(10) Patent No.: US 11,461,633 B2
(45) Date of Patent: Oct. 4, 2022

(54) SEMICONDUCTOR DEVICE AND IMAGE RECOGNITION SYSTEM

(71) Applicant: RENESAS ELECTRONICS CORPORATION, Tokyo (JP)

(72) Inventors: Atsushi Nakamura, Tokyo (JP); Akira Utagawa, Tokyo (JP); Shigeru Matsuo, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 1118 days.

(21) Appl. No.: 16/035,010

(22) Filed: Jul. 13, 2018

(65) Prior Publication Data

US 2019/0065947 A1 Feb. 28, 2019

(30) Foreign Application Priority Data

Aug. 25, 2017 (JP) .............................. JP2017-162057

(51) Int. Cl.
*G06N 3/08* (2006.01)
*G06N 3/063* (2006.01)
(Continued)

(52) U.S. Cl.
CPC .............. *G06N 3/08* (2013.01); *G06F 17/153* (2013.01); *G06N 3/04* (2013.01); *G06N 3/0454* (2013.01);
(Continued)

(58) Field of Classification Search
CPC .......... G06N 3/08; G06N 3/04; G06N 3/0454; G06N 3/063; G06F 17/153; G06V 10/454; G06V 10/94; G06T 1/20; G06T 7/0002
See application file for complete search history.

(56) References Cited

U.S. PATENT DOCUMENTS

| | | | |
|---|---|---|---|
| 7,937,346 B2 | 5/2011 | Kato et al. | |
| 2014/0337262 A1 | 11/2014 | Kato et al. | |

(Continued)

FOREIGN PATENT DOCUMENTS

| | | | | |
|---|---|---|---|---|
| CN | 1413338 A | * | 4/2003 | ............ B41J 11/008 |
| JP | 2008-310700 A | | 12/2008 | |
| JP | 2016-099707 A | | 5/2016 | |

OTHER PUBLICATIONS

James Garland et al., "Low Complexity Multiply Accumulate Unit for Weight-Sharing Convolutional Neural Networks", IEEE Computer Architecture Letter, vol. 16, No. 2, Jul. 1, 2017, pp. 132-153.

(Continued)

*Primary Examiner* — Alan Chen
(74) *Attorney, Agent, or Firm* — McDermott Will & Emery LLP

(57) ABSTRACT

A semiconductor device includes an image recognition device having a convolution arithmetic processing circuit. The convolution arithmetic processing circuit includes a coefficient register where coefficients of an integration coefficient table are set, a product calculation circuit that calculates products of an input image and the coefficients, a channel register where a channel number of the integration coefficient table is set, a channel selection circuit that selects an output destination of a cumulative addition arithmetic operation on the basis of the channel number, and a plurality of output registers that store a result of the cumulative addition arithmetic operation. The integration coefficient table is a table where a plurality of input coefficient tables are integrated and the integration coefficient table has a size of N×N. The product calculation circuit can calculate data of N×N all at once.

4 Claims, 14 Drawing Sheets

(51) Int. Cl.
*G06F 17/15* (2006.01)
*G06N 3/04* (2006.01)
*G06V 10/94* (2022.01)
*G06V 10/44* (2022.01)

(52) U.S. Cl.
CPC .......... *G06N 3/063* (2013.01); *G06V 10/454* (2022.01); *G06V 10/94* (2022.01)

(56) References Cited

U.S. PATENT DOCUMENTS

| 2016/0379073 A1* | 12/2016 | Pan ..................... G06V 10/955 |
| | | 382/279 |
| 2017/0116495 A1 | 4/2017 | Nomura et al. |
| 2018/0137084 A1* | 5/2018 | Du ....................... G06F 17/153 |

OTHER PUBLICATIONS

Aravind Vasudevan et al., "Parallel Multi Channel Convulution Using General Matrix Multiplication" 2017 IEEE 28th International Conference on Application-Specific Systems, Architectures and Processors (ASAP), Jul. 1, 2017, pp. 19-24.
Extended European Search Report issued in corresponding European Patent Application No. 18185295.5-1207, dated Jan. 22, 2019.

\* cited by examiner

FIG. 1

IMAGE

| 0 | 1 | 1 | 0 |
|---|---|---|---|
| 1 | 0 | 1 | 0 |
| 1 | 0 | 1 | 0 |
| 0 | 1 | 0 | 0 |

FILTER

| 1 | 0 |
|---|---|
| 0 | 1 |

FIG. 2A

| 0x1 | 1x0 | 1 | 0 |
|---|---|---|---|
| 1x0 | 0x1 | 1 | 0 |
| 1 | 0 | 1 | 0 |
| 0 | 1 | 0 | 0 |

| 0 | | |
|---|---|---|
| | | |
| | | |

| 0 | 1x1 | 1x0 | 0 |
|---|-----|-----|---|
| 1 | 0x0 | 1x1 | 0 |
| 1 | 0 | 1 | 0 |
| 0 | 1 | 0 | 0 |

1x1+1x0+0x0+1x1=2

| 0 | 2 |   |
|---|---|---|
|   |   |   |
|   |   |   |

FIG. 2C

| 0 | 1 | 1 | 0 |
|---|---|---|---|
| 1 | 0 | 1 | 0 |
| 1 | 0 | 1x1 | 0x0 |
| 0 | 1 | 0x0 | 0x1 |

1x1+0x0+0x0+0x1=1

| 0 | 2 | 1 |
|---|---|---|
| 1 | 1 | 1 |
| 2 | 0 | 1 |

SEMICONDUCTOR DEVICE AND IMAGE RECOGNITION SYSTEM

CROSS-REFERENCE TO RELATED APPLICATIONS

The disclosure of Japanese Patent Application No. 2017-162057 filed on Aug. 25, 2017 including the specification, drawings and abstract is incorporated herein by reference in its entirety.

BACKGROUND

The present disclosure relates to a semiconductor device and, for example, can be applied to a semiconductor device including an image recognition device.

Since Convolutional Neural Network (CNN) won first place in an international image classification contest (ImageNet Large Scale Visual Recognition Competition: ILSVRC) in 2012, the CNN has been used in many image recognition processes and its usefulness has been recognized. In recent years, there is a growing demand to use the CNN not only in a workstation with rich resources but also in a built-in type device. The CNN is disclosed in, for example, Japanese Unexamined Patent Application Publication No. 2008-310700 and Japanese Unexamined Patent Application Publication No. 2016-99707.

SUMMARY

However, the CNN is required to repeat a convolution arithmetic operation of an input image and coefficients the number of times corresponding to the number of channels, so that an operation amount is extremely large. Therefore, it is difficult to implement the CNN on a built-in type SoC (Silicon on Chip) whose resource is limited. The other problems and novel features will become apparent from the description of the present specification and the accompanying drawings.

A brief outline of a typical invention of the present disclosure is as follows. A semiconductor device has a function to perform cumulative addition for each channel and performs a convolution arithmetic operation in parallel in a plurality of channels.

According to the semiconductor device described above, it is possible to reduce the operation amount of the convolution arithmetic operation.

BRIEF DESCRIPTION OF THE DRAWINGS

FIG. 1 is a diagram for explaining a concept of a convolution arithmetic operation.

FIG. 2A is a diagram for explaining a concept of the convolution arithmetic operation.

FIG. 2B is a diagram for explaining a concept of the convolution arithmetic operation.

FIG. 2C is a diagram for explaining a concept of the convolution arithmetic operation.

DETAILED DESCRIPTION

Figure 3:
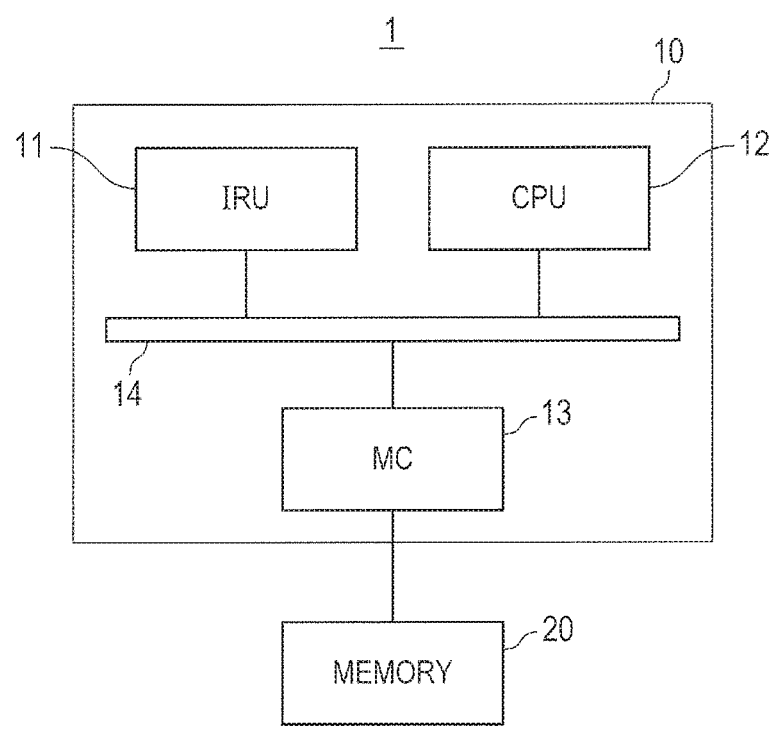
FIG. 3 is a diagram showing a configuration example of an image recognition system.

First, a convolution arithmetic operation of CNN will be described with reference to FIGS. 1 and 2A to 2C. FIG. 1 is a diagram for explaining a concept of the convolution arithmetic operation. FIGS. 2A to 2C are diagrams for explaining a concept of the convolution arithmetic operation and are diagrams showing a product sum arithmetic operation of pixel values of an image and coefficients of a filter.

For ease of description, when an image is simplified and represented by numbers, the image can be considered as a matrix of height×width. As shown in the left of FIG. 1, an input image is represented by, for example, 4×4 binary values. A 2×2 filter as shown in the right of FIG. 1 is applied to such a matrix and a convolution arithmetic operation is performed.

As shown in FIG. 2A, the filer is overlapped on a most upper left portion of the image, and values in the same positions are multiplied together. The results of the multiplication are summed up and outputted. As shown in FIG. 2B, the filter is shifted horizontally by one pixel, and the values in the same positions are multiplied together in the same manner. The results of the multiplication are summed up and outputted. Thereafter, as shown in FIG. 2C, the values of the filter and the input image are multiplied together and summed up until the filter reaches the lower right.

When the convolution arithmetic operation is performed, it is required that the convolution arithmetic operation of the input image and the coefficients of the filter is repeated for the number of times corresponding to the number of channels (the number of filters).

An embodiment has a function to perform cumulative addition for each channel and performs a convolution arithmetic operation in parallel in a plurality of channels. It is possible to simultaneously and collectively perform the convolution arithmetic operation on channels, the number of which is the same as the number of blocks where the cumulative addition can be performed for each channel, so that processing time can be reduced.

It is possible to perform the convolution arithmetic operation of a plurality of channels at one time by combining the convolution arithmetic processing circuit and an integration coefficient table. It is possible to realize the CNN by a small number of product sum arithmetic operations without performing useless product sum arithmetic operations. By using an input pattern generation circuit, it is possible to perform an arbitrary convolution arithmetic operation without depending on a filer size.

Hereinafter, an embodiment and a modified example will be described with reference to the drawings. However, in the description below, the same components are denoted by the same reference numerals and the description thereof may be omitted.

Embodiment

Figure 4:
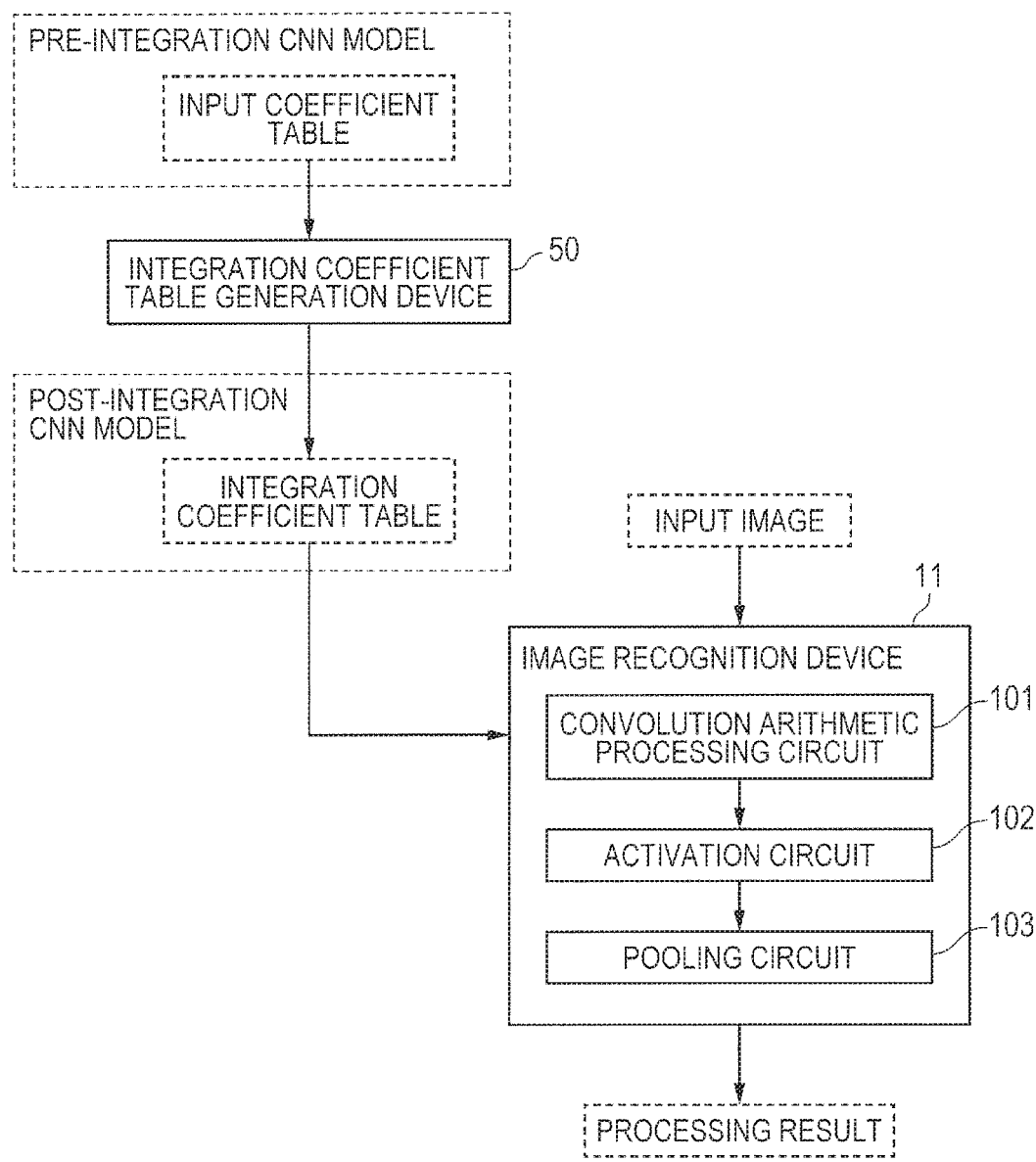
FIG. 4 is a diagram showing a flow of data of the image recognition system in FIG. 3.

FIG. 3 is a block diagram showing a configuration example of an image recognition system. FIG. 4 is a diagram showing a flow of data of the image recognition system in FIG. 3.

As shown in FIG. 3, an image processing system 1 includes a semiconductor device 10 and a semiconductor storage device (MEMORY) 20. The semiconductor device 10 includes an image recognition device (IRU) 11, a central processing unit (CPU) 12, a control circuit (MC) 13 of the semiconductor storage device 20, and a bus that couples these, in a single semiconductor chip. The semiconductor storage device 20 is, for example, a DDR-SDRAM.

As shown in FIG. 4, an integration coefficient table generation device 50 integrates an input coefficient table included in a pre-integration CNN model stored in a storage device, generates an integration coefficient table of a post-integration CNN model, and stores the integration coefficient table in the semiconductor storage device 20. The image recognition device 11 of the image processing system 1 processes an input image stored in the semiconductor storage device 20 on the basis of the integration coefficient table and stores a processing result in the semiconductor storage device 20.

The input image is an image acquired by an image pickup device (not shown in the drawings) having an optical system (lens) and an image pickup element. The input image is all or part of the image acquired by the image pickup device. The input image is stored in the semiconductor storage device 20.

The image recognition device 11 performs calculation by using the integration coefficient table of the post-integration CNN model and the input image and outputs a processing result. The image recognition device 11 is a device that performs an arithmetic operation required in the post-integration CNN model.

The processing result is an output of the image recognition device 11. For example, the processing result is a classification result or a segmentation result of the input image or a detection result of a specific object. The processing result is stored in the semiconductor storage device 20.

The pre-integration CNN model indicates a general CNN model. For example, the pre-integration CNN model is AlexNet, VGGNet, SegNet, or R-CNN. The input coefficient table includes coefficients used for the convolution arithmetic operation among coefficients included in the pre-integration CNN model.

The integration coefficient table generation device 50 is a device that analyzes the input coefficient table and generates an integration coefficient table where processing can be performed by using a smaller number of convolution arithmetic operations, and is configured by, for example, a central processing unit and a storage device that stores a program of the central processing unit and the like.

The post-integration CNN model is a model where the number of convolution arithmetic operations of the pre-integration CNN model is reduced. The integration coefficient table is an output of the integration coefficient table generation device 50.

The image recognition device 11 includes a convolution arithmetic processing circuit 101, an activation circuit 102, and a pooling circuit 103, and can cumulatively add product calculation results for each channel. The convolution arithmetic processing circuit 101 adds results of convolution arithmetic operations for each channel number corresponding to each coefficient. The activation circuit 102 and the pooling circuit 103 are circuits that perform activation processing and pooling processing, respectively. For the activation processing, for example, a logistic sigmoid function and a ReLU function (Rectified Linear Units), which are well known, are used. The pooling processing is a method that reduces a size of a large image while keeping important information. In the pooling processing, for example, a well-known maximum pooling function that segments an image into small windows and outputs a maximum value of data inputted from each segmented window and a well-known average pooling function that outputs an average value of inputted data are used.

Figure 5:
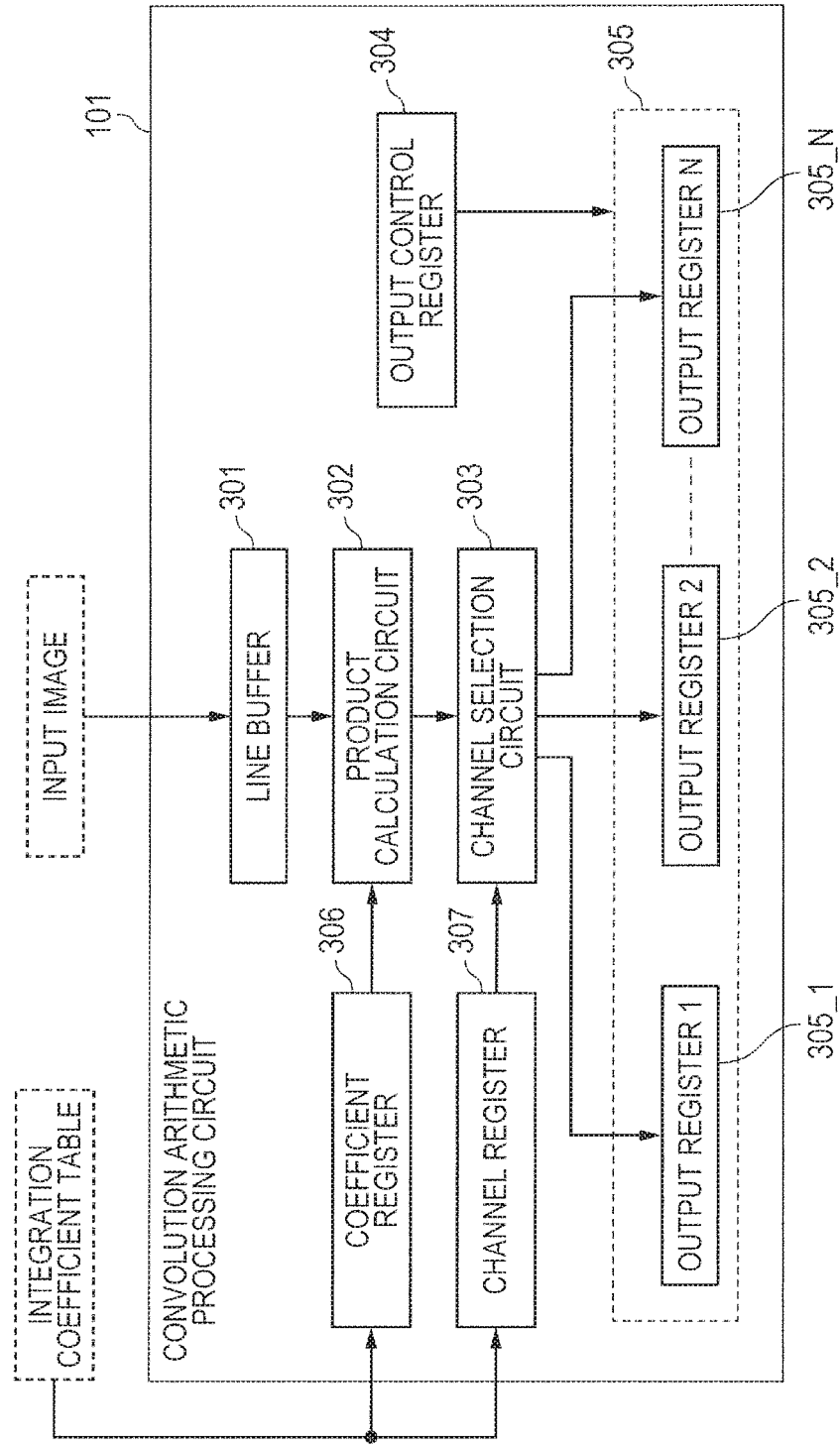
FIG. 5 is a diagram for explaining a configuration example of a convolution arithmetic processing circuit in FIG. 4.
Figure 6:
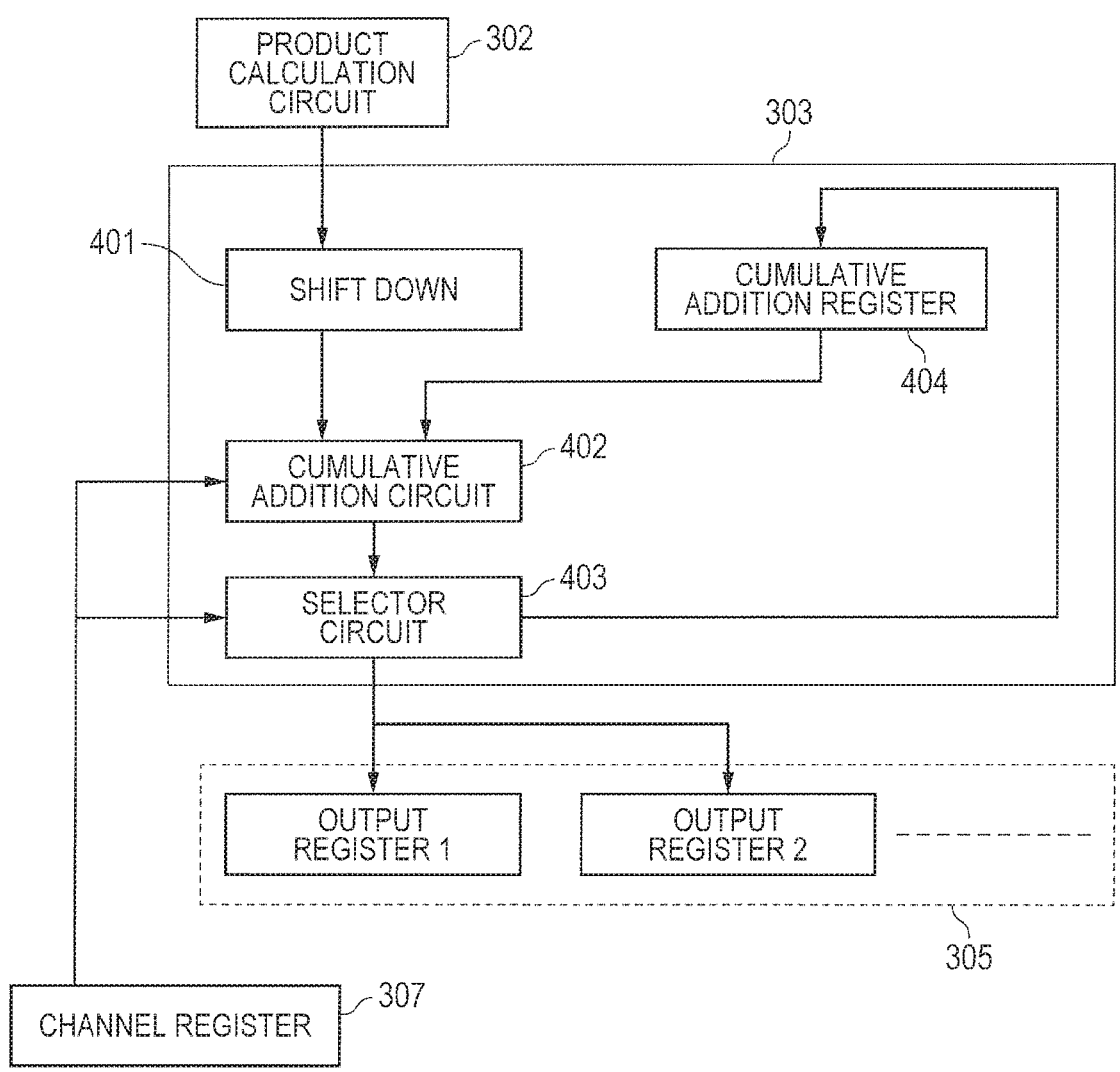
FIG. 6 is a diagram for explaining a configuration example of a channel selection circuit in FIG. 5.

FIG. 5 is a block diagram for explaining a configuration example of the convolution arithmetic processing circuit. FIG. 6 is a block diagram for explaining a configuration example of a channel selection circuit in FIG. 5.

The integration coefficient table is a table in which coefficients used in the convolution arithmetic operation are stored. A channel number is added to a coefficient. The integration coefficient table generation device 50 generates the integration coefficient table from a plurality of input coefficient tables.

The convolution arithmetic processing circuit 101 outputs results of a plurality of number of times of convolution arithmetic operations from one convolution arithmetic operation. The convolution arithmetic processing circuit 101 includes a line buffer 301, a product calculation circuit 302, a channel selection circuit 303, an output control register 304, output registers 305 (a first output register 305_1, a second output register 305_2, . . . , and an Nth output register 305_N), a coefficient register 306, and a channel register 307. The line buffer 301 acquires input image data for a specified number of lines from the semiconductor storage device 20.

The product calculation circuit 302 calculates a product of the coefficient register 306 and an input image from the line buffer 301. The channel selection circuit 303 adds a channel number registered in the channel register 307 to a product calculation result, cumulatively adds the product calculation result, and outputs the product calculation result to an appropriate output register 305 according to the channel number in accordance with the output control register 304. The output control register 304 associates the channel number with an output register number.

As shown in FIG. 6, the channel selection circuit 303 includes a shift down circuit 401, a cumulative addition circuit 402, a selector circuit 403, and a cumulative addition register 404. The shift down circuit 401 shifts down the product calculation result by a specified number of bits and then outputs the product calculation result. The cumulative addition circuit 402 adds results outputted by the cumulative addition register 404 and the shift down circuit 401 for each channel and outputs the added results. The selector circuit 403 outputs the output of the cumulative addition circuit 402 to a specified output register 305.

The output control register 304, the coefficient register 306, and the channel register 307 are set by the CPU 12.

Figure 7:
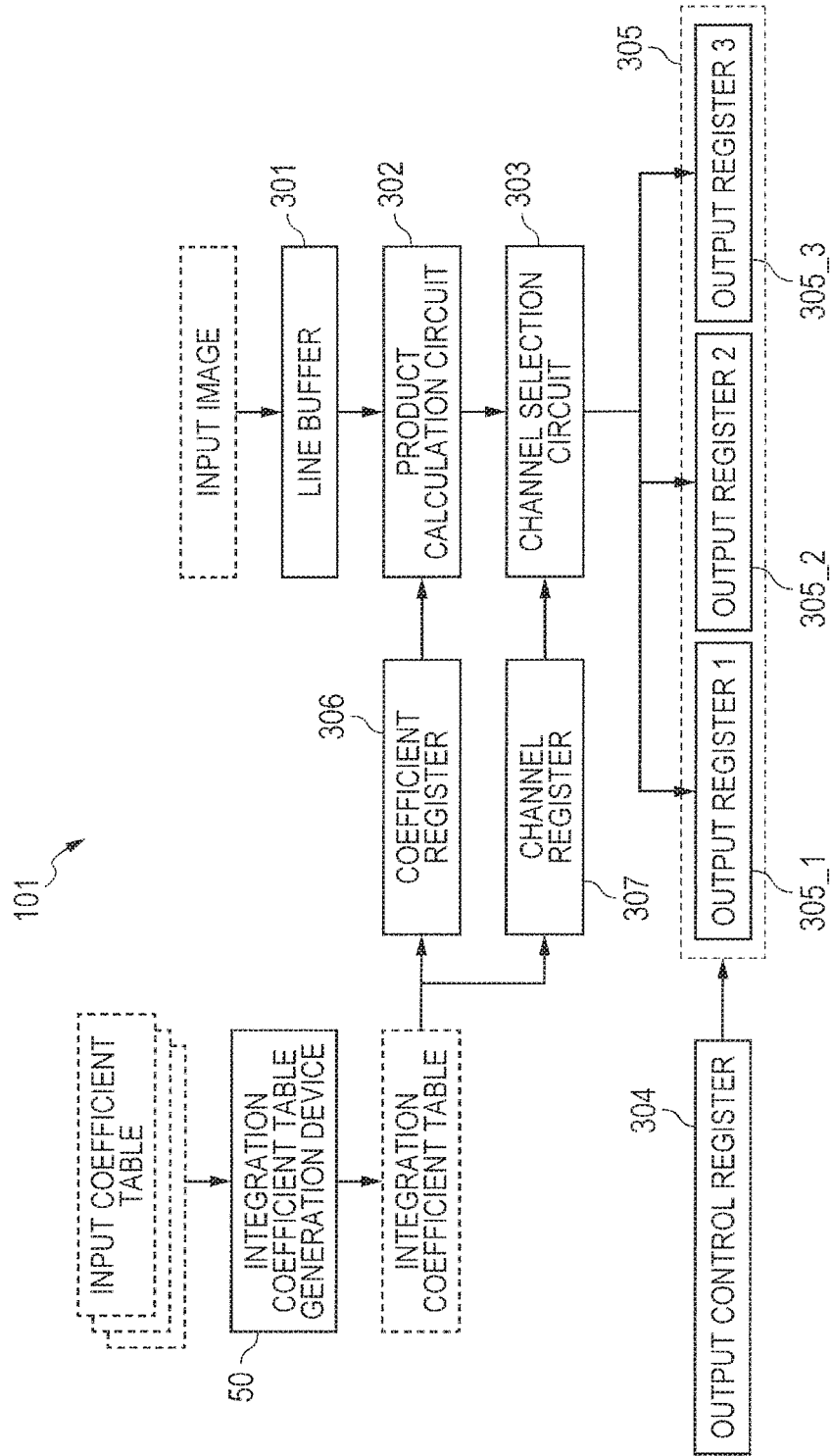
FIG. 7 is a diagram for explaining a configuration of a 3×3 convolution arithmetic processing circuit.
Figure 8:
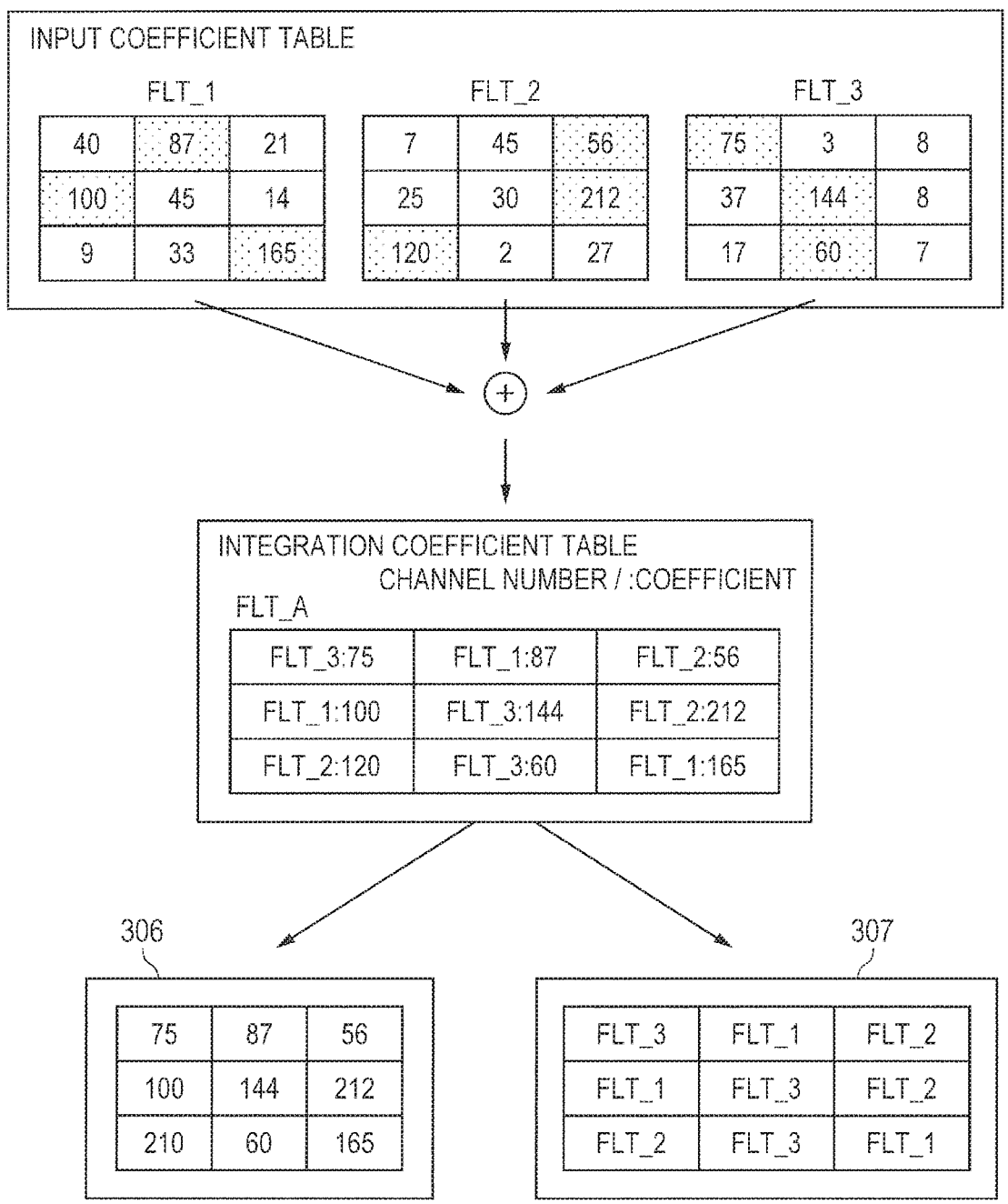
FIG. 8 is a schematic diagram for explaining an operation of an integration coefficient table generation device in FIG. 7.
Figure 9:
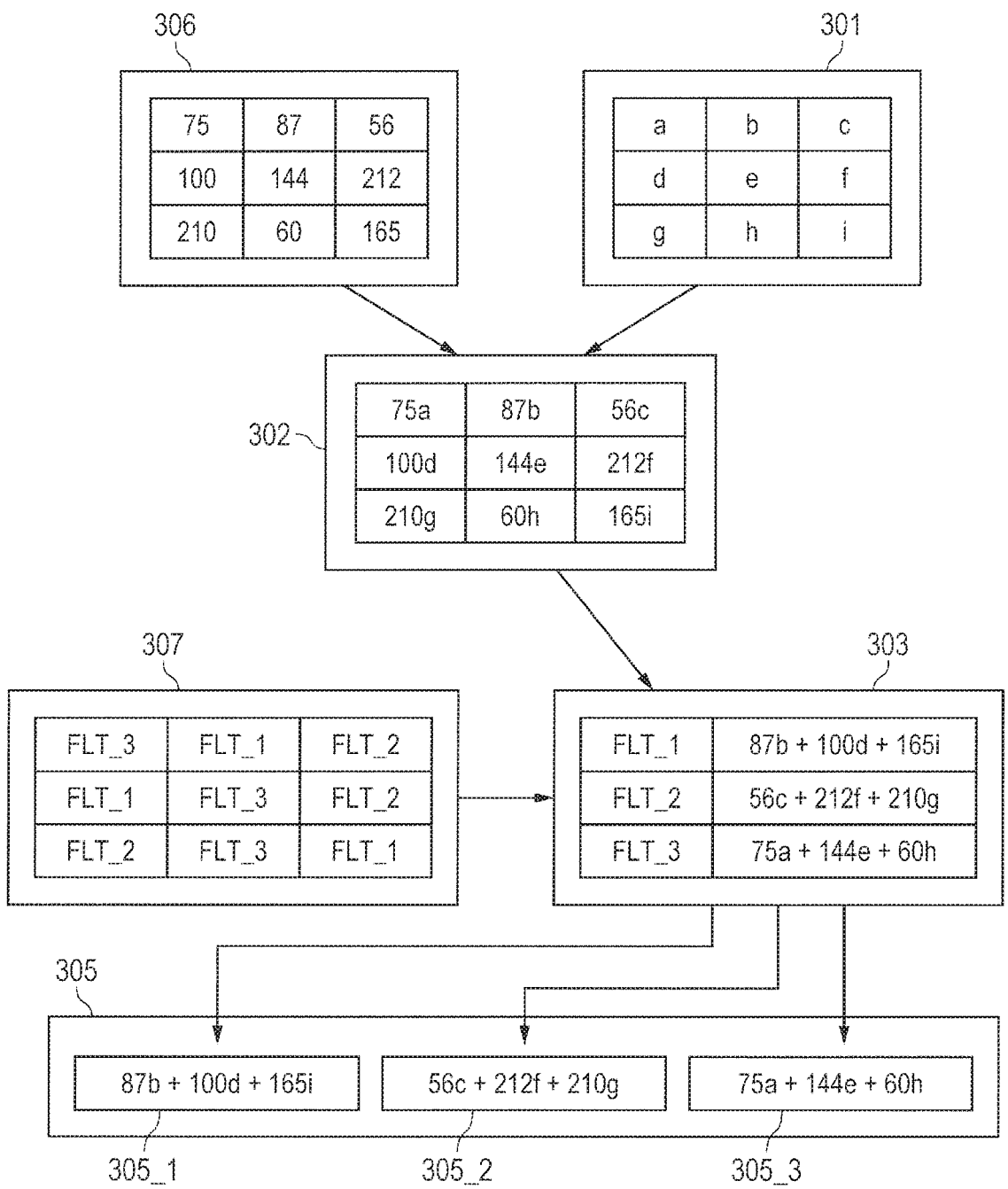
FIG. 9 is a conceptual diagram for explaining an operation of the convolution arithmetic processing circuit in FIG. 7.
Figure 10:
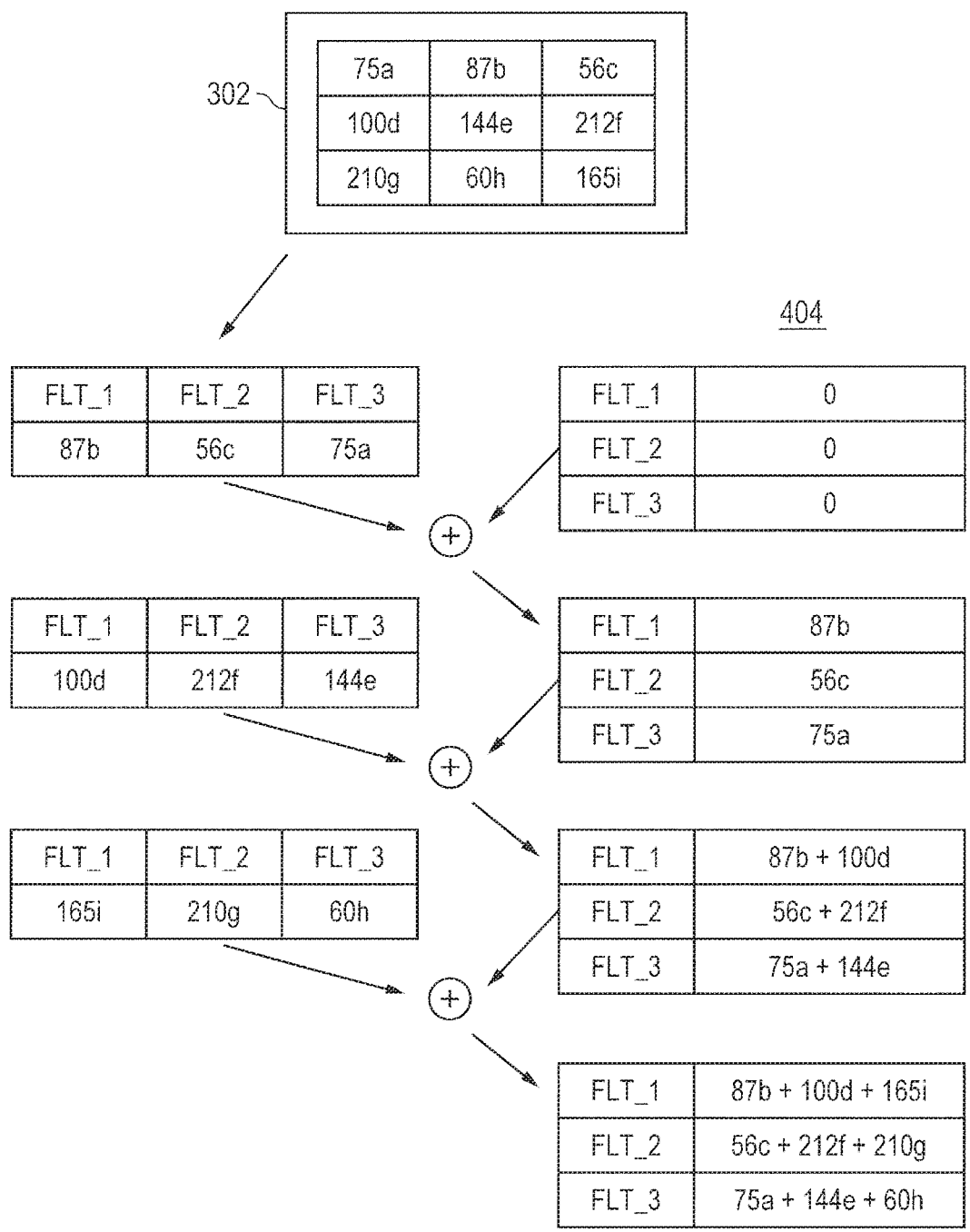
FIG. 10 is a conceptual diagram for explaining an operation of a cumulative addition circuit in FIG. 7.

An example where the integration coefficient table generation device 50 generates one type of integration coefficient table from three types of input coefficient tables and performs the convolution arithmetic operation by using the integration coefficient table will be described with reference to FIGS. 7 to 10. FIG. 7 is a block diagram for explaining a configuration of a 3×3 convolution arithmetic processing circuit. FIG. 8 is a schematic diagram for explaining an operation of the integration coefficient table generation device in FIG. 7. FIG. 8 represents a case where the integration coefficient table generation device generates one integration coefficient table from the input coefficient tables for three channels. FIG. 9 is a conceptual diagram for explaining an operation of the convolution arithmetic processing circuit in FIG. 7. FIG. 10 is a conceptual diagram for explaining an operation of the cumulative addition circuit in FIG. 7.

The convolution arithmetic processing circuit in FIG. 7 performs one 3×3 convolution arithmetic operation for three channels by using a 3×3 convolution arithmetic operation circuit.

Here, a coefficient of a coefficient table used in the convolution is defined as $w_{i,j,channel}$, the table is defined as $C_{l,w,channel}$, and the following equation is established.

[Formula 1]

$$C_{l,w,channel} = \begin{bmatrix} w_{0,0,channel} & w_{0,1,channel} & \cdots & \cdots \\ w_{1,0,channel} & w_{1,1,channel} & \cdots & \cdots \\ \vdots & \vdots & \ddots & \\ \vdots & \vdots & & w_{l-1,w-1,channel} \end{bmatrix}$$ [数 1]

Here, i,j represent integers, channel represents a channel number, l represents the width of the table, w represents the height of the table. A coefficient of the integration coefficient table is represented as follows:

[数 2]

$$w_{i,j,FLT\_A} = \text{MAX}(w_{i,j,FLT\_1}, w_{i,j,FLT\_2}, w_{i,j,FLT\_3})$$ [Formula 2]

Here, MAX( . . . ) is a function that returns the maximum value of arguments.

Further, $l_{i,j,FLT\_A}$ is defined as a character string that represents a type of a table used as the integration coefficient table, and the following equation is established.

[数 3]

$$l_{i,j,FLT\_A} = \text{CHANNEL}(w_{i,j,FLT\_1}, w_{i,j,FLT\_2}, w_{i,j,FLT\_3})$$ [Formula 3]

Here, CHANNEL ( . . . ) is a function representing a channel number that returns the maximum value of arguments. At this time, $C_{3,3,FL\_A}$ of the integration coefficient table is represented as follows:

[Formula 4]

$$C_{3,3,FLT\_A} = \begin{bmatrix} l_{0,0,FLT\_A}: & l_{0,1,FLT\_A}: & l_{0,2,FLT\_A}: \\ w_{0,0,FLT\_A} & w_{0,1,FLT\_A} & w_{0,2,FLT\_A} \\ l_{1,0,FLT\_A}: & l_{1,1,FLT\_A}: & l_{1,2,FLT\_A}: \\ w_{0,0,FLT\_A} & w_{1,1,FLT\_A} & w_{1,2,FLT\_A} \\ l_{2,0,FLT\_A}: & l_{2,1,FLT\_A}: & l_{2,2,FLT\_A}: \\ w_{2,0,FLT\_A} & w_{2,1,FLT\_A} & w_{2,2,FLT\_A} \end{bmatrix}$$ [数 4]

FIG. 8 schematically represents how the integration coefficient table is generated when specifically l=3 and w=3. The integration coefficient table generation device 50 processes three types of input coefficient tables (FLT_1, FLT_2, and FLT_3) and outputs an integration coefficient table (FLT_A). Largest coefficients of those of the input coefficient tables (FLT_1, FLT_2, and FLT_3) are outputted to the integration coefficient table. Each of the largest coefficients is shaded. The maximum value of the upper left coefficients is "75" of FLT_3, the maximum value of the upper center coefficients is "87" of FLT_1, and the maximum value of the upper right coefficients is "56" of FLT_2. The maximum value of the middle left coefficients is "100" of FLT_1, the maximum value of the middle center coefficients is "144" of FLT_3, and the maximum value of the middle right coefficients is "212" of FLT_2. The maximum value of the lower left coefficients is "120" of FLT_2, the maximum value of the lower center coefficients is "60" of FLT_3, and the maximum value of the lower right coefficients is "165" of FLT_1. In the integration coefficient table (FLT_A) where the above maximum values are integrated, the shaded portions of each of the input coefficient tables (FLT_1, FLT_2, and FLT_3) are arranged. In addition to the coefficients, the channel numbers are also stored in the integration coefficient table (FLT_A).

As shown in FIG. 8, the convolution arithmetic processing circuit 101 reads the coefficients and the channel numbers from the integration coefficient table and sets their values in the coefficient register 306 and the channel register 307, respectively.

As shown in FIG. 9, the product calculation circuit 302 calculates products of the values set in the coefficient register 306 and the values set in the line buffer 301 all at once by a 3×3 product calculation circuit. The channel selection circuit 303 sets outputs of the cumulative addition circuit 402 to the output registers 305 on the basis of the values (channel numbers) set in the channel register 307. The output control register 304 sets a correspondence between the output registers 305 and the channel register 307. In this example, the first output register 305_1 corresponds to FLT_1, the second output register 305_2 corresponds to FLT_2, and the third output register 305_3 corresponds to FLT_3. The convolution arithmetic processing circuit 101 outputs results of performing a convolution arithmetic operation by using the coefficients of FLT_1, FLT_2, and FLT_3 to the first output register 305_1, the second output register 305_2, and the third output register 305_3, respectively.

As shown in FIG. 10, the cumulative addition circuit 402 inputs calculation results of the product calculation circuit 302 and contents of the cumulative addition register 404 for each channel on the basis of the channel numbers of the channel register 307 and adds each channel in parallel. Thereby, a cumulative addition result for each channel can be obtained at the same time. The convolution arithmetic processing circuit 101 separately performs cumulative addition for each channel number instead of cumulatively adding the results of the product calculation.

In a specific example, an example is described where the 3×3 convolution arithmetic operation for three channels is performed at once by using the 3×3 convolution arithmetic operation circuit. However, the arithmetic operation is not limited to this, and in the embodiment, it is possible to perform an N×N convolution arithmetic operation for N channels at once by using an N×N convolution arithmetic operation circuit.

Modified Example

Hereinafter, a typical modified example will be illustrated. In a description of the modified example below, the same reference numerals as those of the above embodiment may be used for portions having the same configurations and functions as those described in the above embodiment. For the descriptions of these portions, the descriptions in the above embodiment may be appropriately applied to the extent where there is no technical contradiction. Further, parts of the above embodiment and all or parts of the modified example may by appropriately and complexly applied to the extent where there is no technical contradiction.

Figure 11:
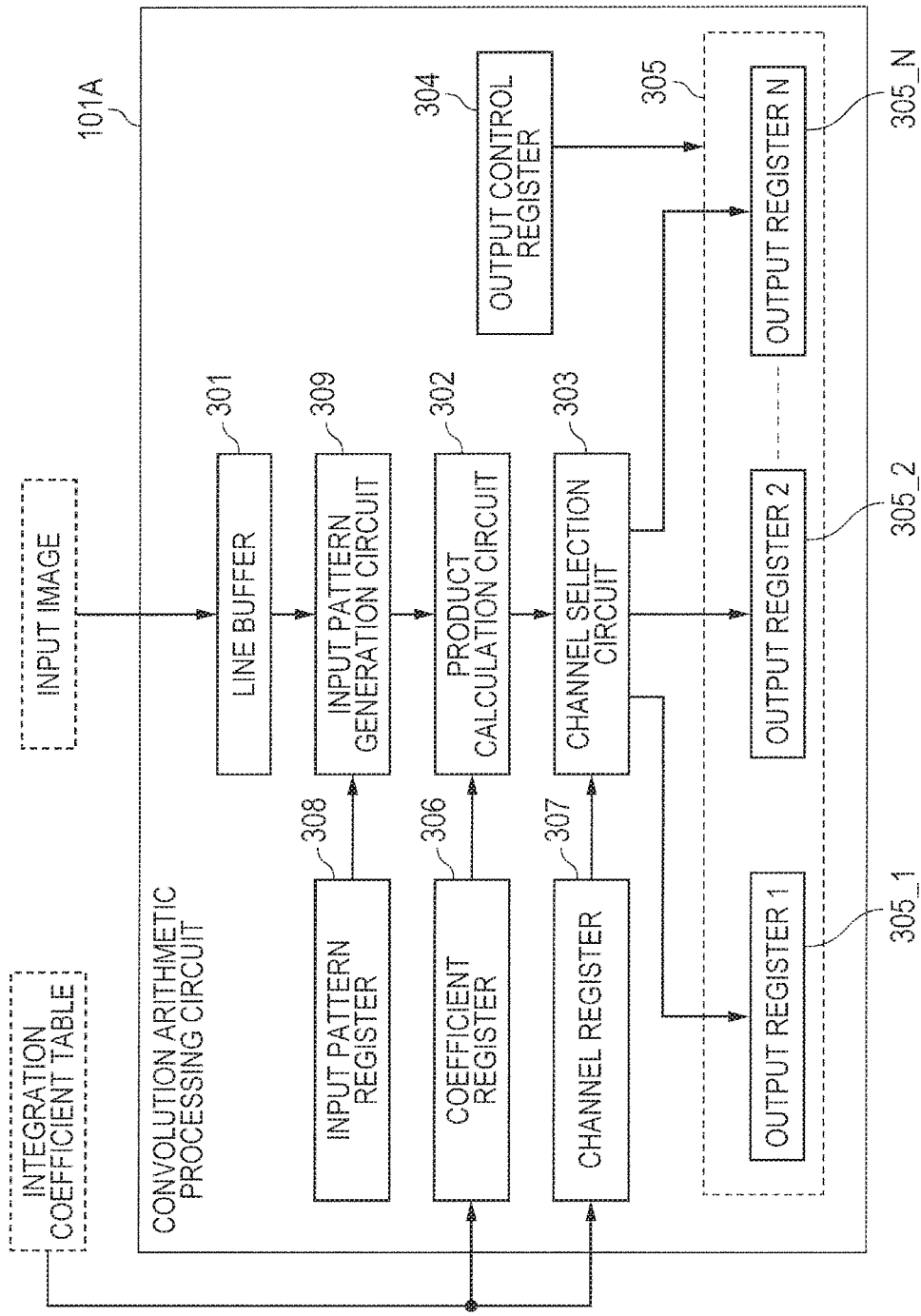
FIG. 11 is a diagram for explaining another configuration example of the convolution arithmetic processing circuit in FIG. 4.

An example where a convolution arithmetic operation is performed regardless of an arrangement of an input image will be described with reference to FIG. 11. FIG. 11 is a block diagram for explaining another configuration example of the convolution arithmetic processing circuit.

A convolution arithmetic processing circuit 101A has an input pattern register 308 and an input pattern generation circuit 309 in addition to the configuration of the convolution arithmetic processing circuit 101 of the embodiment. The input pattern register 308 is a register for setting how to output pixel values set in the line buffer 301 from the input pattern generation circuit 309. The input pattern generation circuit 309 is a circuit that receives input from the line buffer 301 and generates an output according to the input pattern register 308. The input pattern register 308 is set by the CPU 12.

Figure 12:
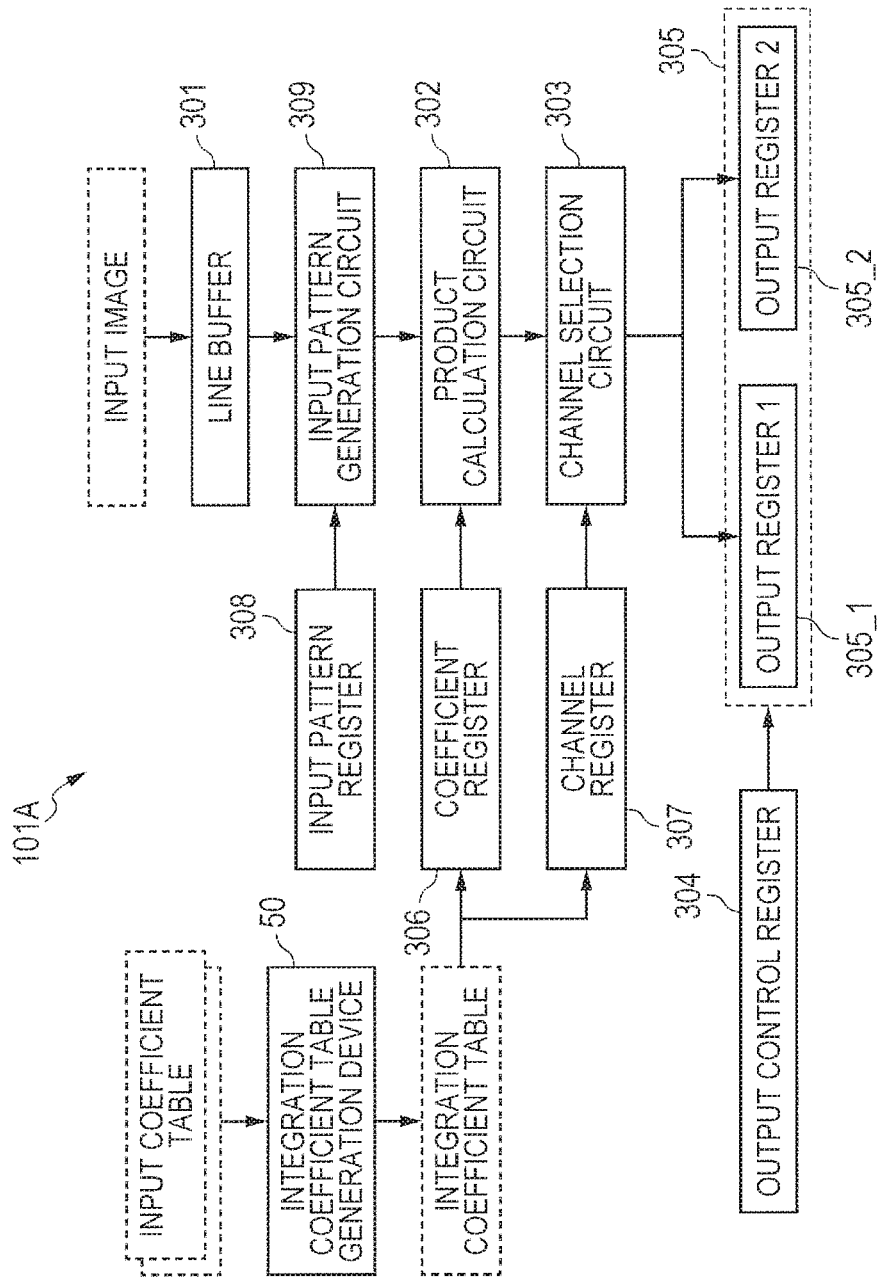
FIG. 12 is a diagram for explaining a configuration of a 5×5 convolution arithmetic processing circuit.
Figure 13:
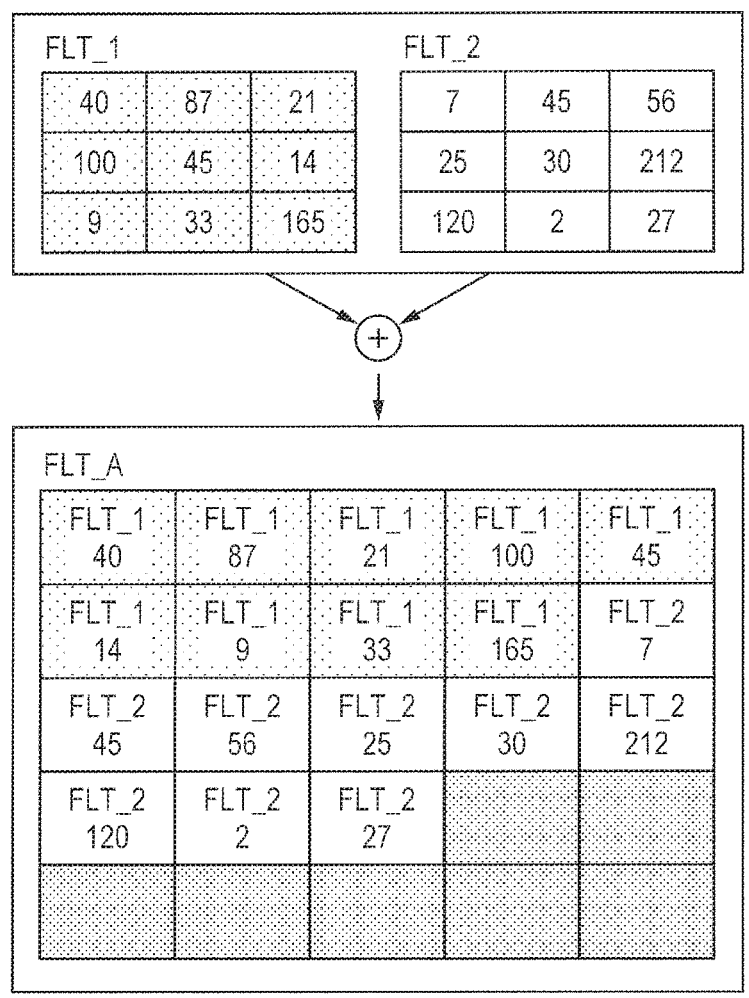
FIG. 13 is a schematic diagram for explaining an operation of an integration coefficient table generation device in FIG. 12.
Figure 14:
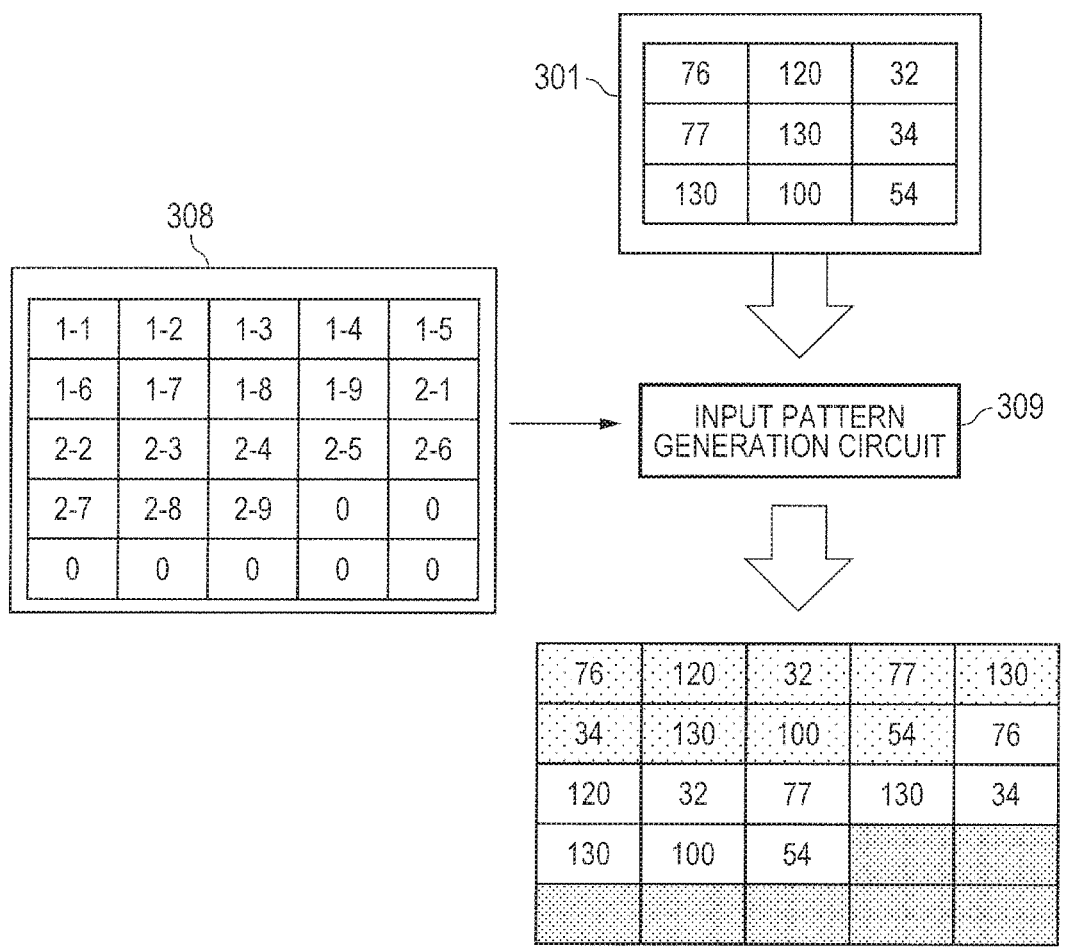
FIG. 14 is a schematic diagram for explaining an operation of an input pattern generation circuit in FIG. 12.

Next, an example where the integration coefficient table generation device 50 generates one type of integration coefficient table from two types of input coefficient tables and performs the convolution arithmetic operation by using the integration coefficient table will be described with reference to FIGS. 12 to 14. FIG. 12 is a diagram for explaining a configuration of a convolution arithmetic processing circuit. FIG. 13 is a schematic diagram for explaining an operation of an integration coefficient table generation device in FIG. 12. FIG. 13 indicates a case of generating one integration coefficient table from input coefficient tables for two channels. FIG. 14 is a schematic diagram for explaining an operation of an input pattern generation circuit in FIG. 12. FIG. 14 indicates a case of generating a 5×5 input image formed from 3×3 input images for two channels.

The convolution arithmetic processing circuit 101A in FIG. 12 performs two 3×3 convolution arithmetic operations at once by using a 5×5 convolution arithmetic operation circuit.

When the input coefficient tables are $C_{3,3,FLT\_1}$ and $C_{3,3,FLT\_2}$, and the integration coefficient table is $C_{5,5,FLT\_A}$, the following equation is established.

[Formula 5]

$$C_{5,5,FLT\_A} = \begin{bmatrix} FLT\_1: & FLT\_1: & FLT\_1: & FLT\_1: & FLT\_1: \\ C_{0,0,FLT\_1} & C_{0,1,FLT\_1} & C_{0,2,FLT\_1} & C_{1,0,FLT\_1} & C_{1,1,FLT\_1} \\ FLT\_1: & FLT\_1: & FLT\_1: & FLT\_1: & FLT\_2: \\ C_{1,2,FLT\_1} & C_{2,0,FLT\_1} & C_{2,1,FLT\_1} & C_{2,2,FLT\_1} & C_{0,0,FLT\_2} \\ FLT\_2: & FLT\_2: & FLT\_2: & FLT\_2: & FLT\_2: \\ C_{0,1,FLT\_2} & C_{0,2,FLT\_2} & C_{1,0,FLT\_2} & C_{1,1,FLT\_2} & C_{1,2,FLT\_2} \\ FLT\_2: & FLT\_2: & FLT\_2: & 0 & 0 \\ C_{2,0,FLT\_2} & C_{2,1,FLT\_2} & C_{2,2,FLT\_2} & & \\ 0 & 0 & 0 & 0 & 0 \end{bmatrix}$$

Further, $I_{i,j}$ is defined as a pixel value (gray value) of ith row and jth column of an input image, an output of the input pattern generation circuit 309 is defined as $A_{5,5}$, and the following equation is established.

[Formula 6]

$$A_{5,5} = \begin{bmatrix} I_{i,j} & I_{i+1,j} & I_{i+2,j} & I_{i+1,j} & I_{i+1,j+1} \\ I_{i+2,j+1} & I_{i,j+2} & I_{i+1,j+2} & I_{i+2,j+2} & I_{i,j} \\ I_{i+1,j} & I_{i+2,j} & I_{i+1,j} & I_{i+1,j+1} & I_{i+2,j+1} \\ I_{i,j+2} & I_{i+1,j+2} & I_{i+2,j+2} & & \end{bmatrix}$$

FIG. 13 schematically shows how the integration coefficient table is generated when specifically l=3 and w=3. The integration coefficient table generation device 50 processes two types of input coefficient tables (FLT_1 and FLT_2) and outputs an integration coefficient table (FLT_A). The coefficients of the 3×3 input coefficient tables (FLT_1 and FLT_2) are outputted to the 5×5 integration coefficient table.

As shown in FIG. 13, from left to right of the first row of FLT_A, coefficients "40", "87", and "21" in the first row of FLT_1 and coefficients "100" and "45" in the second row of FLT_1 are arranged. From left to right of the second row of FLT_A, the right end coefficient "14" in the second row of FLT_1, coefficients "9", "33" and "165" in the third row of FLT_1, and the left end coefficient "7" in the first row of FLT_2 are arranged. From left to right of the third row of FLT_A, the center coefficient "45" and the right end coefficient "56" in the first row of FLT_2 and coefficients "25", "30", and "212" in the second row of FLT_2 are arranged. From left to right of the fourth row of FLT_A, coefficients "120", "2", and "27" in the third row of FLT_2 are arranged. No coefficient is arranged in the right two positions in the fourth row of FLT_A and all positions in the fifth row of FLT_A, and these positions become blank spaces. In addition to the coefficients, the channel numbers are also stored in the integration coefficient table (FLT_A).

As shown in FIG. 14, the input pattern generation circuit 309 outputs pixel values in a form where the 3×3 pixels acquired from the line buffer 301 are repeated based on the 5×5 input pattern of the input pattern register 308. The input pattern defines an arrangement order of the first 3×3 pixels (1-1, 1-2, . . . , and 1-9) and the second 3×3 pixels (2-1, 2-2, . . . , and 2-9).

As shown in FIG. 14, from left to right of the first row of the output of the input pattern generation circuit 309, pixel values "76", "120", and "32" in the first row of an input image and pixel values "77" and "130" in the second row of the input image are arranged. From left to right of the second row, the right end pixel value "34" in the second row of the input image, pixel values "130", "100", and "54" in the third row of the input image, and the left end pixel value "78" in the first row of the second input image are arranged. From left to right of the third row, the center pixel value "120" and the right end pixel value "32" in the first row of the input image and pixel values "77", "130", and "34" in the second row of the input image are arranged. From left to right of the fourth row, pixel values "130", "110", and "54" in the third row of the input image are arranged. No pixel is arranged in the right two positions in the fourth row and all positions in the fifth row, and these positions become blank spaces. Thereby, the arrangement of the pixels of the output of the input pattern generation circuit 309 is the same as the arrangement of the coefficients of the integration coefficient table (FLT_A).

It is possible to read the pixels stored in the line buffer 301 in an arbitrary form by adding the input pattern register 308 and the input pattern generation circuit 309.

In the same manner as in the embodiment, the convolution arithmetic processing circuit 101A reads the coefficients and the channel numbers from the integration coefficient table and sets their values in the coefficient register 306 and the channel register 307, respectively.

In a manner similar to that in the embodiment, the product calculation circuit 302 calculates products of the values set in the coefficient register 306 and the values generated by the input pattern generation circuit 309 all at once by a 5×5 product calculation circuit. The channel selection circuit 303 sets outputs of the cumulative addition circuit 402 to the output registers 305 on the basis of the values (channel numbers) set in the channel register 307. The output control register 304 sets a correspondence between the output registers 305 and the channel register 307. In this example, the first output register 305_1 corresponds to FLT_1 and the second output register 305_2 corresponds to FLT_2. The convolution arithmetic processing circuit 101A outputs results of performing a convolution arithmetic operation by using the coefficients of FLT_1 and FLT_2 to the first output register 305_1 and the second output register 305_2, respectively. In the same manner as in the embodiment, the cumulative addition circuit 402 inputs calculation results of the product calculation circuit and contents of the cumulative addition register for each channel on the basis of the channel numbers of the channel register 307 and adds each channel in parallel. Thereby, a cumulative addition result for each channel can be obtained at the same time.

In the modified example, it is possible to perform an arbitrary convolution arithmetic operation by using the input pattern register 308 and the integration coefficient table generation device 50 in combination with each other. Therefore, even when a 5×5 convolution arithmetic operation circuit is used, it is possible to efficiently perform a 3×3 or 1×1 convolution arithmetic operation.

In a specific example, an example is described where two 3×3 convolution arithmetic operations are performed at once by using the 5×5 convolution arithmetic operation circuit. However, the arithmetic operation is not limited to this, and in the modified example, it is possible to perform L number of M×M convolution arithmetic operations at once by using an N×N convolution arithmetic operation circuit. Here, $M<N$ and $L=INT(N^2/M^2)\geq 2$.

While the invention made by the inventors has been specifically described based on the embodiment and the modified example, it is needless to say that the present invention is not limited to the embodiment and the modified example and may be variously modified.

What is claimed is:

1. An image recognition system comprising:
an image recognition device configured to perform an image recognition using a convolutional neural network, the image recognition device including a convolution arithmetic processing circuit, an activation circuit, and a pooling circuit;
an integration coefficient table generation device configured to:
  receive a plurality of input coefficient tables, the plurality of input coefficient tables being respectively associated with channel numbers, the plurality of input coefficient tables respectively having M×M coefficients as their elements for a convolutional arithmetic operation; and
  generate an integration coefficient table that has N×N coefficients as its elements by integrating the plurality of input coefficient tables, the integration coefficient table associating the N×N coefficients with N×N channel numbers, M and N each being an integer of 2 or more, M being a value smaller than N,
  wherein the convolution arithmetic processing circuit includes a coefficient register and a channel register,
  wherein the convolution arithmetic processing circuit is configured to read the N×N coefficients and the N×N channel numbers from the generated integration coefficient table and set their values in the coefficient register and the channel register, respectively;
wherein the convolution arithmetic processing circuit further includes:
  a line buffer configured to receive input image data for a specified number of lines;
  an input pattern register;
  an input pattern generation circuit configured to change an arrangement of the input image data based on content of the input pattern register;
  a product calculation circuit configured to calculate N×N element-wise products of the input image data output from the input pattern generation circuit and the coefficients set in the coefficient register;
  a plurality of output registers;
  an output control register configured to associate channel number with output register numbers, the output register numbers being the number of the plurality of output registers; and
  a channel selection circuit configured to:
    element-wisely associate the calculated N×N element-wise products with the N×N channel numbers set in the channel register;
    cumulatively sum the calculated products with respect to each associated channel number; and
    output, in accordance with the output control register, the cumulatively summed products to an output register associated with the channel number among the plurality of output registers,
wherein the product calculation circuit is configured to calculate data of N×N all at once to perform the image recognition.

2. The image recognition system according to claim 1, wherein the channel selection circuit includes:
  a cumulative addition circuit configured to add the products for each channel number; and
  a cumulative addition register configured to hold an output of the cumulative addition circuit for each channel number, and wherein the cumulative addition circuit is configured to perform the addition for each channel number in parallel.

3. The image recognition system according to claim 2, wherein the channel selection circuit further includes a selector configured to output, with respect to each channel number, the output of the cumulative addition circuit to one of the output registers that is associated with the channel number.

4. The image recognition system according to claim 1, wherein the line buffer is configured to receive the input image data of an input image of M×M, and
wherein the input pattern generation circuit is configured to change the arrangement of the input image data by repeating the input image data of the input image of M×M.

* * * * *